(12) United States Patent
Russell (10) Patent No.: US 12,187,085 B2
(45) Date of Patent: Jan. 7, 2025

(54) WEIGHT DISTRIBUTING HITCH

(71) Applicant: Gregory Alan Russell, Brookfield, IL (US)

(72) Inventor: Gregory Alan Russell, Brookfield, IL (US)

(73) Assignee: Gregory Alan Russell, Brookfield, IL (US)

( * ) Notice: Subject to any disclaimer, the term of this patent is extended or adjusted under 35 U.S.C. 154(b) by 608 days.

(21) Appl. No.: 17/451,416

(22) Filed: Oct. 19, 2021

(65) Prior Publication Data

US 2023/0120012 A1    Apr. 20, 2023

(51) Int. Cl.
*B60D 1/24*    (2006.01)
*B60D 1/167*   (2006.01)
*B60D 1/42*    (2006.01)

(52) U.S. Cl.
CPC ............. *B60D 1/247* (2013.01); *B60D 1/167* (2013.01); *B60D 1/42* (2013.01)

(58) Field of Classification Search
CPC .......... B60D 1/247; B60D 1/167; B60D 1/42; B60D 1/345
See application file for complete search history.

(56) References Cited

U.S. PATENT DOCUMENTS

| | | | | |
|---|---|---|---|---|
| 3,633,939 A * | 1/1972 | Evernham | ............... | B60D 1/345 280/455.1 |
| 3,756,618 A * | 9/1973 | Lewis | .................... | B60D 1/345 280/455.1 |
| 3,814,463 A * | 6/1974 | Tunesi | ..................... | B60D 1/32 280/455.1 |
| 4,792,151 A * | 12/1988 | Feld | ........................ | B60D 1/065 280/509 |
| 5,647,604 A * | 7/1997 | Russell | .................... | B60D 1/04 280/492 |
| 8,210,559 B2 | 7/2012 | Russell | | |
| 2011/0175324 A1* | 7/2011 | Russell | .................... | B60D 1/04 280/507 |

* cited by examiner

*Primary Examiner* — Tony H Winner
*Assistant Examiner* — Hosam Shabara
(74) *Attorney, Agent, or Firm* — Schwegman Lundberg & Woessner, P.A.

(57) ABSTRACT

A hitch system includes an upper hitch portion that is configured to couple to a trailer coupler portion and to a vehicle coupler portion to provide multiple degrees of rotational freedom as well as longitudinal coupling for towing the trailer by the vehicle. A weight distributing lower hitch portion couples to the upper hitch portion about a transverse axis. The weight distributing lower hitch portion includes spring bars extending to rearward points on a frame of the trailer between a tongue of the trailer and the axle of the trailer. The upper hitch portion and lower hitch portion are biased away from each other and hence bias the spring bars away from the trailer frame. The spring bars may then be coupled to the trailer frame by using respective levers to transfer weight distribution.

20 Claims, 7 Drawing Sheets

WEIGHT DISTRIBUTING HITCH

BACKGROUND

Weight distributing hitches are commonly used with ball coupler type trailer hitches to help distribute weight of the trailer more efficiently. A weight distribution hitch alters the point where the load from the trailer is transferred to the vehicle. Rather than the weight being centered on the point where the trailer and vehicle connect, the weight distribution hitch distributes the weight across the axles of the vehicle. Such weight distribution can reduce an imbalance in weight between the front and back of the tow vehicle and lead to dangerous loss of steering control.

A weight distributing hitch (WDH) reduces the amount of downward force on the rear of a tow vehicle. This is accomplished through leverage applied by spring bars coupled between the ball coupler and axle of the trailer. The freedom of motion of WDH systems that currently use ball couplers is severely restricted. The already restricted movement of a ball coupler is further restricted by the spring bars.

SUMMARY

An improved hitch system includes an upper hitch portion that is configured to couple to a trailer coupler portion and to a vehicle coupler portion to provide multiple degrees of rotational freedom as well as longitudinal coupling for towing the trailer by the vehicle.

A weight distributing lower hitch portion couples to the upper hitch portion about a transverse axis. The weight distributing lower hitch portion includes spring bars extending to rearward points on a frame of the trailer between a tongue of the trailer and an axle of the trailer. A pivot bolt may be positioned between the upper hitch portion and lower hitch portion to bias the upper hitch portion and lower hitch portion away from each other and hence bias the spring bars away from the trailer frame. The spring bars may then be coupled to the trailer frame by using respective levers to transfer weight distribution rearward on the trailer, redistributing trailer weight on the hitch system.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The same reference numbers may be used in multiple figures to refer to the same components or elements. The following description of example embodiments is, therefore, not to be taken in a limited sense, and the scope of the present invention is defined by the appended claims.

An improved weight distributing hitch system facilitates unrestricted side to side movement of an attached trailer, or rotation about a vertical hitch axis. Movement of the trailer or rotation about a hitch system longitudinal axis is also enhanced and may only be restricted by safety chains. Trailer movement corresponding to rotation about a transverse axis of the hitch is enhanced over prior systems.

The improved hitch system includes an upper hitch portion that is configured to couple to a trailer coupler portion and to a vehicle coupler portion to provide multiple degrees of rotational freedom as well as longitudinal coupling for towing the trailer by the vehicle.

A weight distributing lower hitch portion couples to the upper hitch portion about a transverse axis. The weight distributing lower hitch portion includes spring bars extending to rearward points on a frame of the trailer between a tongue of the trailer and the axle of the trailer. A pivot bolt is positioned between the upper hitch portion and lower hitch portion to bias the upper hitch portion and lower hitch portion away from each other and hence bias the spring bars away from the trailer frame. The spring bars may then be coupled to the trailer frame by using respective levers to transfer weight distribution.

A vertical axis of the weight distributing lower hitch portion is directly in line with the vertical axis of the upper hitch portion. The weight distributing lower hitch portion and the upper hitch portion move together about the longitudinal axis. Current ball type hitch systems and their weight distributing hitch spring bars, by contrast, work against each other.

Figure 1:
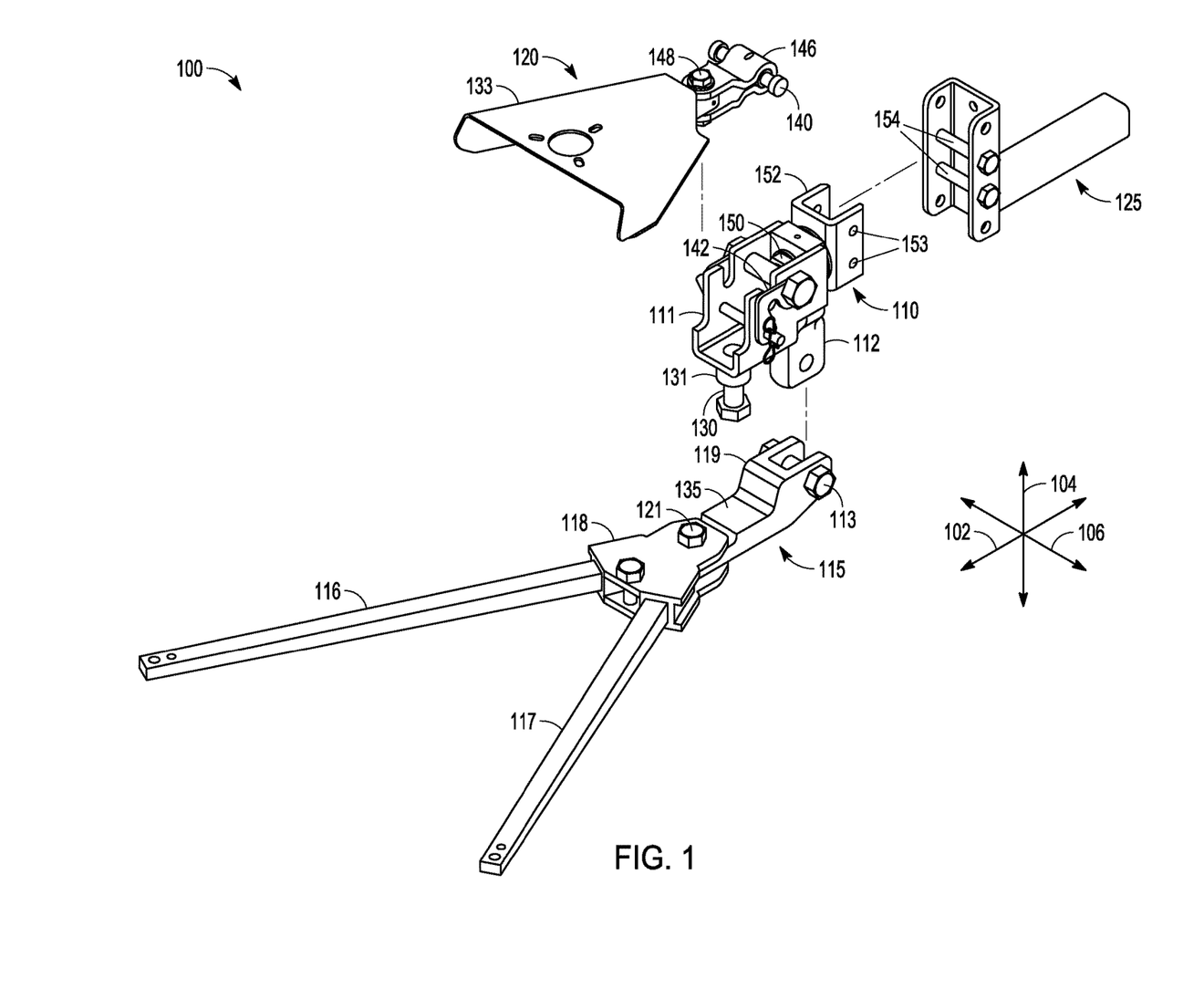
FIG. 1 is an exploded perspective view of a hitch system with weight distribution according to an example embodiment.
Figure 2:
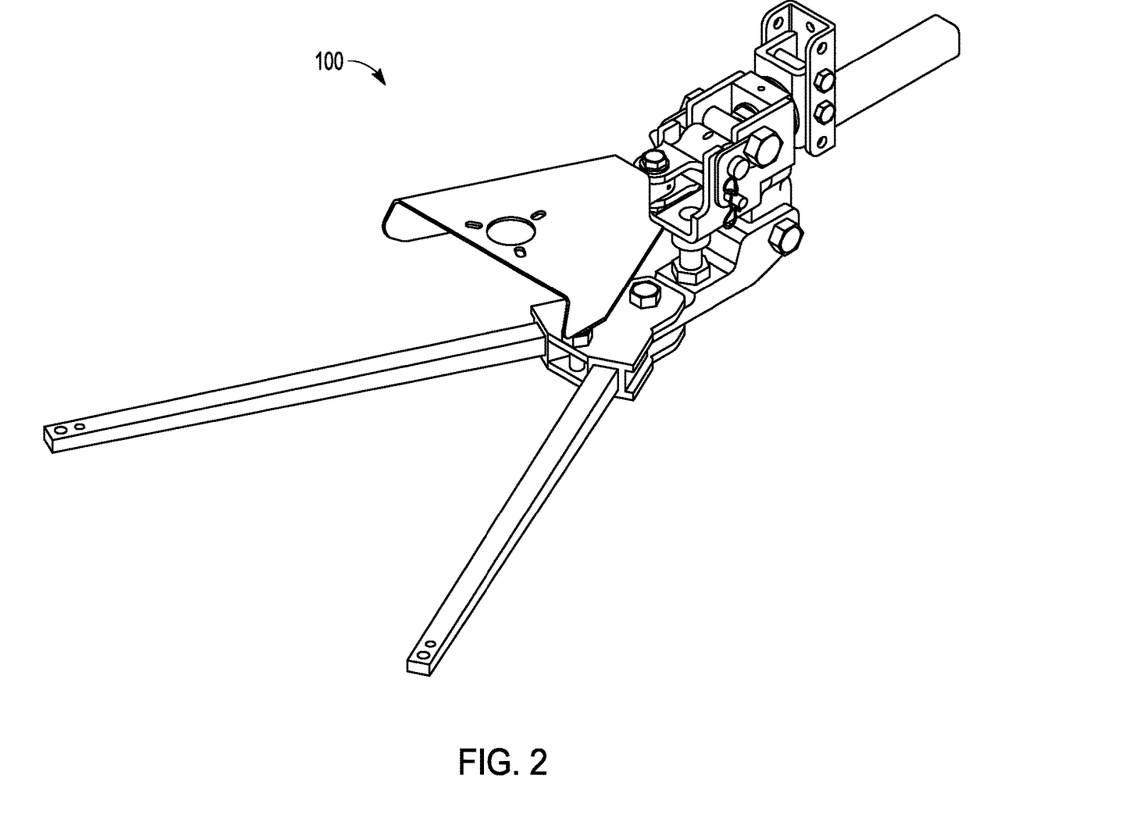
FIG. 2 is a perspective view of the hitch system of FIG. 1 in assembled form according to an example embodiment.

FIG. 1 is an exploded perspective view of a hitch system 100. FIG. 2 is a perspective view of hitch system 100 in assembled form. A cartesian coordinate key is shown to illustrate a longitudinal axis 102, a vertical axis 104, and a transverse axis 106 used as a reference for describing relative positions and rotations of elements of the hitch system 100.

Hitch system 100 includes an upper hitch portion 110 configured to couple to a trailer coupler portion 120 and to a vehicle coupler portion 125. A weight distributing lower hitch portion 115 is coupled to the upper hitch portion 110 via a vertical support 112 rigidly attached to the main body 111 of the upper hitch portion 110 and a transverse axle or rod 113 coupled to the lower hitch portion 115.

Figure 3:
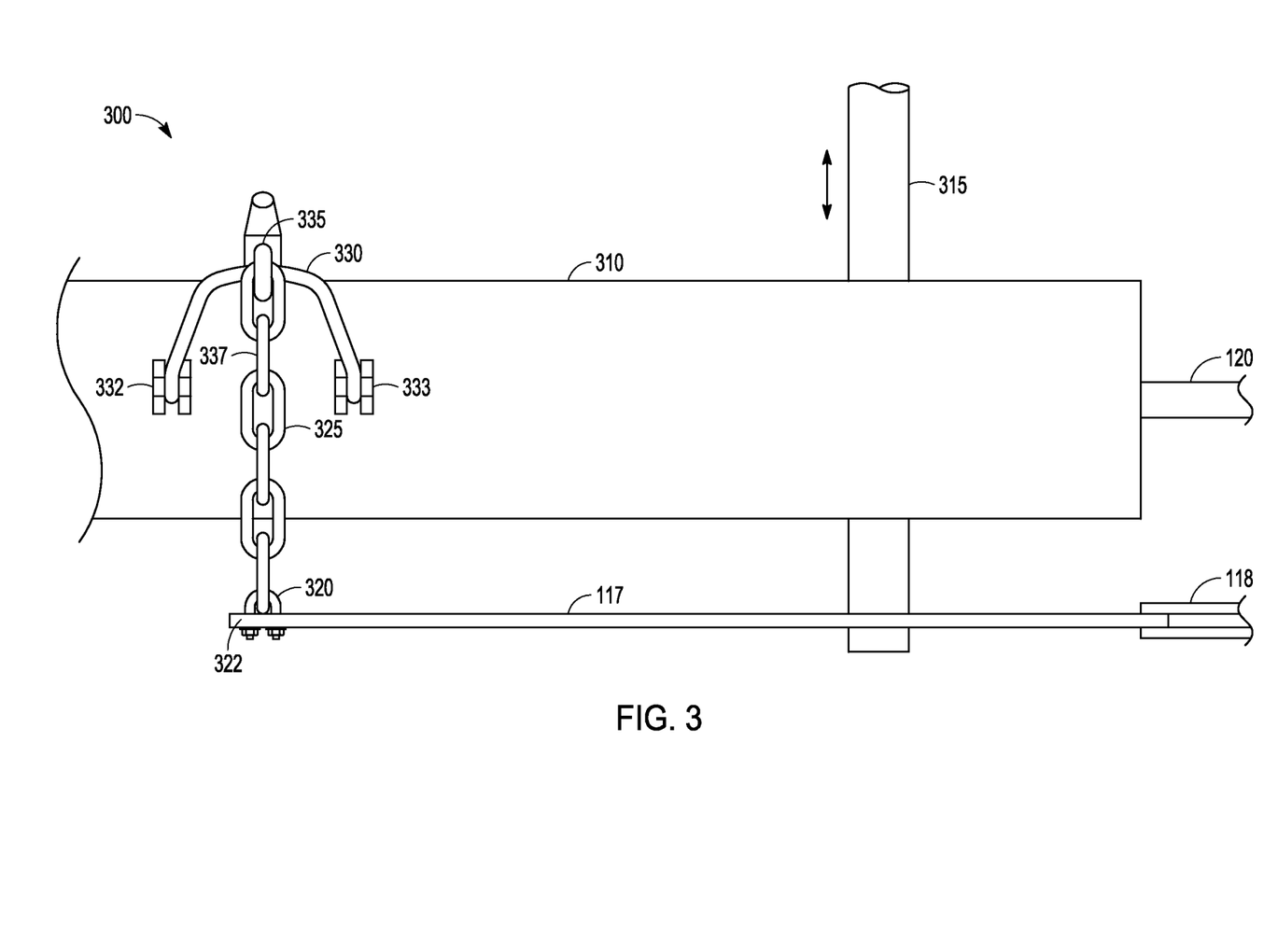
FIG. 3 is a side elevation view of a portion of the hitch system illustrating coupling of spring bars to a trailer frame according to an example embodiment.
Figure 5:
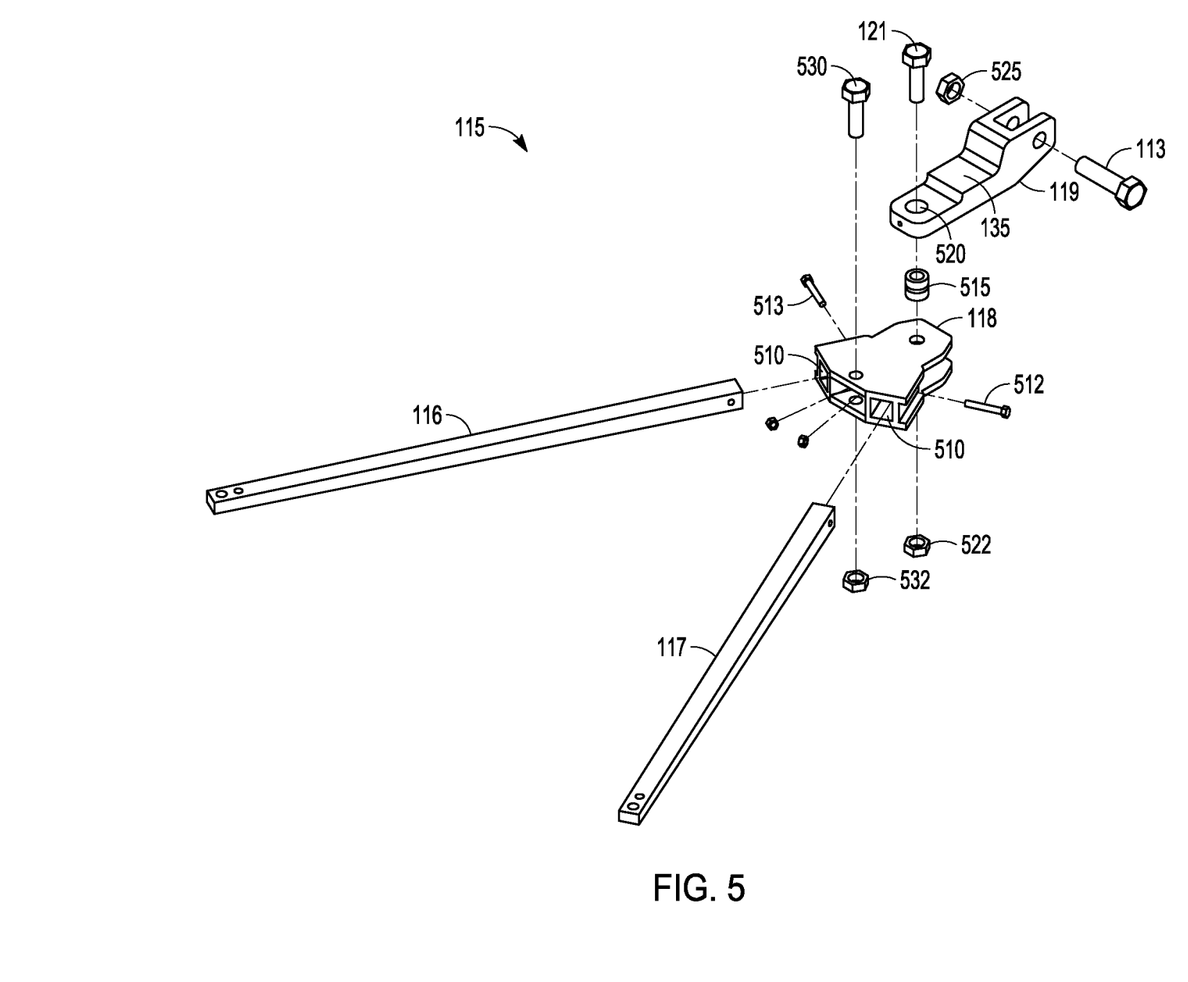
FIG. 5 is an exploded perspective view of a lower hitch portion according to an example embodiment.

The weight distributing lower hitch portion 115 includes a weight distribution lever 119 that is coupled to a head assembly 118 via a vertical axle or bolt 121, permitting rotation about the vertical bolt 121 (and a bushing 515 shown in FIG. 5). The head assembly 118 is configured to couple to spring bars 116 and 117 that are configured to extend to rearward points on a frame of the trailer as shown in FIG. 3.

A pivot bolt 130 or other adjustable length device is positioned between the upper hitch portion 110 and lower hitch portion 115 to bias the upper hitch portion 110 and lower hitch portion 115 away from each other. A first end of the pivot bolt 130 engages an adjustment collar 131 that is fastened to the upper hitch portion 110. The adjustment collar 131 contains threads that mate with threads on the first end of the pivot bolt 130 to adjust a length of the pivot bolt extending toward a lever portion 135 of the weight distribution lever 119. In further examples, the collar 131 may be positioned on the lever portion 135 to exert force on the upper hitch portion 110.

The length of the pivot bolt extending toward the lever portion 135 defines the amount of bias of the lower hitch portion 115 away from the upper hitch portion 110. The biasing action of the pivot bolt causes rotation of the lower hitch portion 115 about a transverse axis of the transverse rod 113. Such biasing action also creates the ability to spring load the spring bars away from the trailer, allowing subsequent loading of the spring bars to distribute the trailer weight.

The pivot bolt 130 thus engages an upper surface of the lower hitch portion via the adjustment collar 131 and extends an adjustable distance vertically between the threaded opening of the collar 131 and the lever portion 135 of the lower hitch portion 115.

Trailer coupler portion 120 includes a coupling shaft or transverse rod 140 that is dimensioned to fit slots 142 and be captured by latch plates 144 rotatably coupled to the upper hitch portion 110. The trailer coupler portion 120 can thus rotate about the transverse rod 140. The transverse rod 140 may be longitudinally positioned in a somewhat vertical alignment with transverse rod 113, thus providing an aligned rotational degree of freedom for both the upper hitch portion and lower hitch portion, allowing some vertical movement relative to the vehicle and trailer about the hitch system 100.

Trailer coupler portion 120 also includes bracket 133 coupled to a coupling portion via a vertical bolt 148. The bracket 133 is configured to couple to the trailer to provide a longitudinal connection for applying force to the trailer during normal towing conditions. Coupling via the vertical bolt 148 allows rotation of the bracket 133 about a vertical axis corresponding to freedom of motion of the trailer in a transverse, or side-to-side motion. The vertical bolt 148 may be positioned in substantially vertical alignment with bolt 121, providing the ability of the head assembly 118 and rods 116 and 117 to also move with the same transverse movement. While perfect vertical alignment may allow significant relative transverse movement less than perfect vertical alignment may also be beneficial as the amount of transverse movement is naturally restricted by vehicle and trailer clearances. The desired amount of vertical alignment will allow desired vehicle and trailer transverse movement for normal towing conditions without unduly stressing components of the hitch system 100.

A further degree of motion is provided by the hitch system 100 via a connection of the upper hitch portion 110 to the vehicle coupler portion 125. A longitudinal axle or bolt 150 is used to couple a position channel 152 to the main body 111 of the upper hitch portion 110. The position channel 152 contains openings 153 to couple to rods 154 of a vehicle coupler position channel 155. The longitudinal bolt 150 allows rotational movement between the vehicle and the trailer. In other words, if one wheel of the trailer is higher than the other wheel, that may result in rotation of the trailer about the longitudinal axis relative to the vehicle.

FIG. 3 is a side elevation view of a portion of the hitch system 100 illustrating coupling of spring bar 117 to a trailer 300 frame 310. In FIG. 3, only a portion of the head assembly 118 and trailer coupler portion 120 are shown. The trailer coupler portion 120 is coupled to the frame 310 of trailer 300 in a conventional manner. In one example, a jack 315 may be used to raise the frame 310 in order to help couple the biased spring bars 117, 116 (not visible in FIG. 3) prior to coupling the spring bars to the trailer frame 310. To facilitate coupling of the spring bars, each spring bar 117 may include a U-bolt 320 fastened to the spring bar at a distal end 322. A link chain 325 is coupled to the U-bolt 320. A lever 330 is coupled to the trailer at points 332, 333 to allow rotation of the lever 330 about such points 332, 333. The lever 330 contains a protrusion 335 to fit within a link 337 of the chain 325. The lever 330 is shown in a closed position. Prior to the closed position, the bar 117 is likely lower than the frame 310. The lever is used to engage the chain at link 337 and cam the chain 325 and the bar 117 into the position shown. The lever 330 may then be locked into place to bias the bars in the position shown and redistribute the weight of the trailer on the hitch system 100. The jack 315 may then be raised to proceed to tow the trailer by the vehicle. While a chain and lever are shown, any other method of biasing the bars 116, 117 towards the trailer frame may be used, such as various combinations of straps, screws, and other types of levers.

Figure 4:
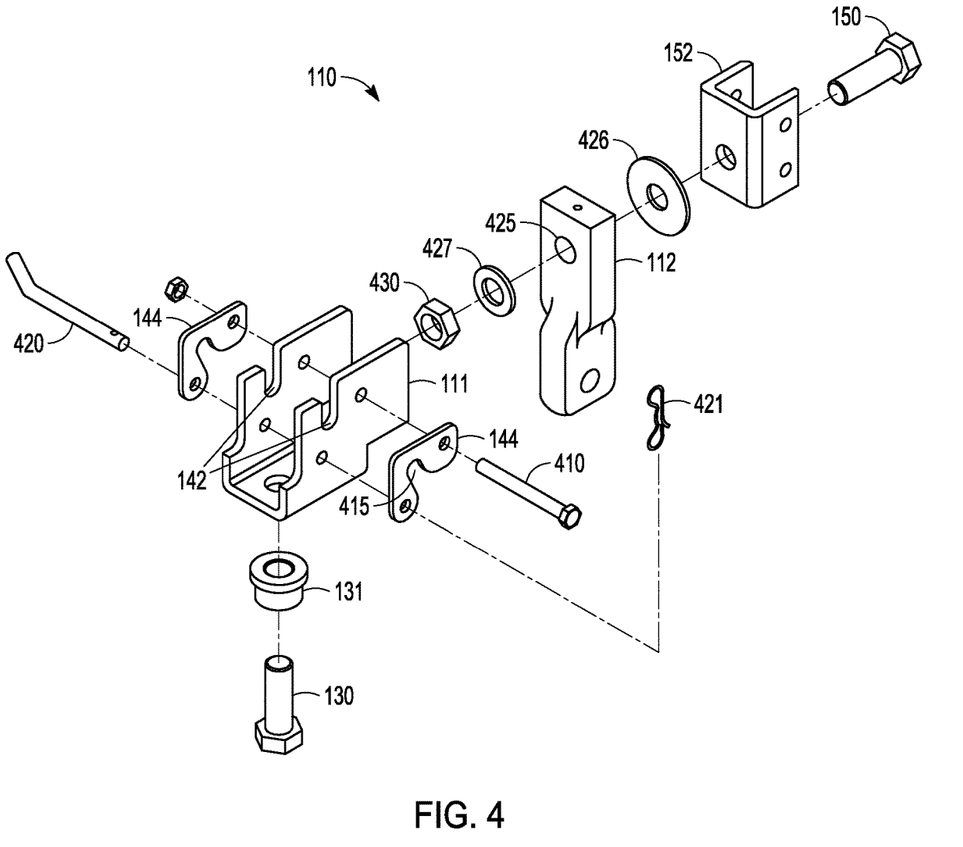
FIG. 4 is an exploded perspective view of an upper hitch portion according to an example embodiment.

FIG. 4 is an exploded perspective view of the upper hitch portion 110. The slots 142 formed in the main body 111 of the upper hitch portion 110 have a width corresponding to the transverse rod 140 of the trailer couplers 120. The latch plates 144 are coupled to the main body 111 via a pin 410. Latch plate slots 415 may be slightly larger than slots 142 to allow rotation of the latch plates about the pin 410 to engage with the rod 140. A pin 420 is then used to secure the latch plates 144 over the pin 410. Pin 420 may then be secured in place via a cotter pin 421 to secure the rod 140 in position for towing the trailer.

In one example, the vertical support 112 may be welded into place in the body 111. Longitudinal bolt 150 is then fastened through a first hole 425 via associated washer 426, 427 and nut 430. Washer 426 is positioned between the vertical support 112 and the position channel 152 to allow respective rotation of the position channel 152 and main body 111 about the longitudinal bolt 150.

FIG. 5 is an exploded perspective view of the lower hitch portion 115. The head assembly 118 may be formed with two openings 510 for receiving the spring bars 116 and 117, which may be retentively coupled into the head assembly via bolts 512 and 513. A bushing 515 may be placed between upper and lower sides of the head assembly 118 and in a hole 520 of the weight distribution lever 119. The vertical bolt 121 is then positioned through the head assembly to rotatingly couple the lever 119 and head assembly 118 via nut 522. Bolt 113 is coupled to the lever 119 via nut 525. A bolt 530 may also be coupled to the head assembly 118 between the opening 510 via a nut 532 to add structural integrity to the head assembly 118.

Figure 6:
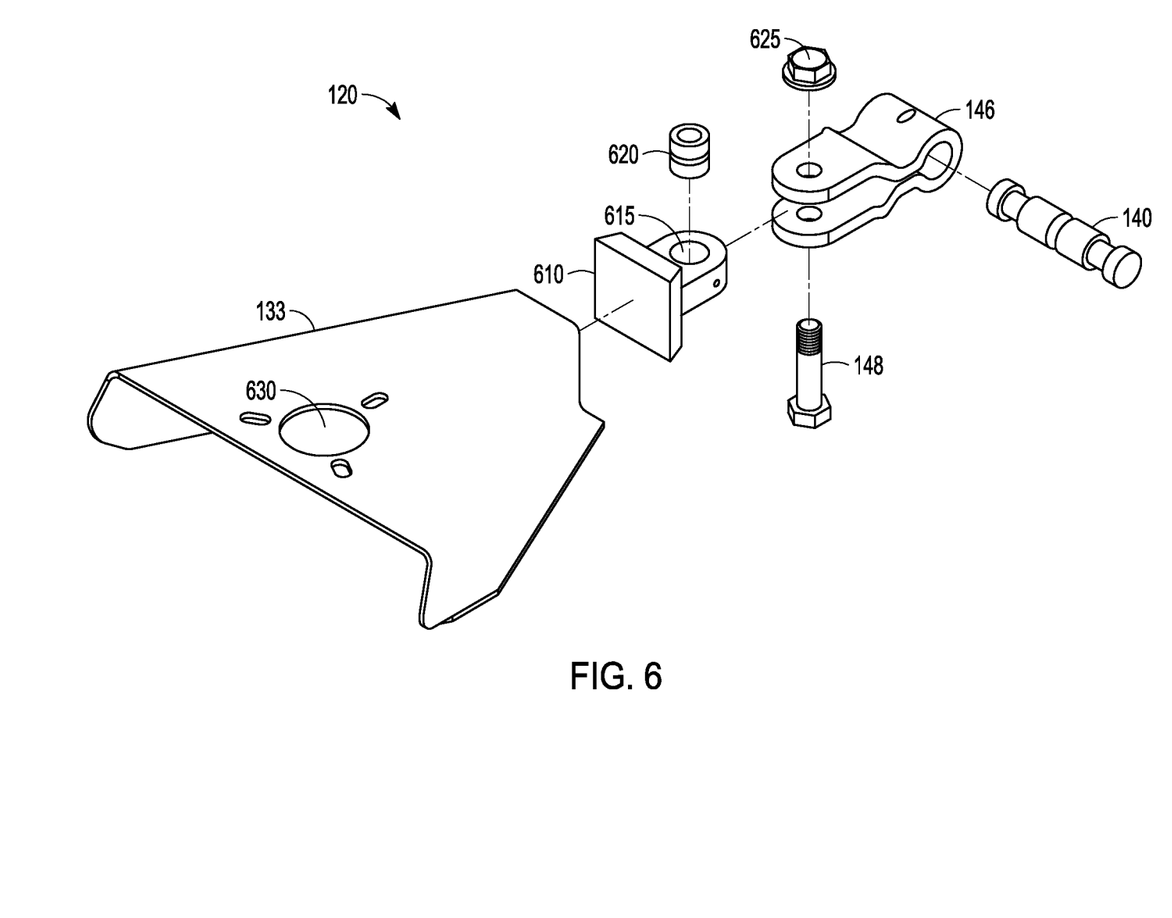
FIG. 6 is an exploded perspective view of a trailer coupler portion according to an example embodiment.

FIG. 6 is an exploded perspective view of the trailer coupler portion 120. A pad eye 610 may be welded or otherwise attached to the bracket 133, also referred to as a 50 degree bracket. The pad eye 610 may include a portion with a hole 615 sized to fit a bushing 620. The vertical bolt 148 may be inserted through the coupling portion 146 and bushing 620 to rotatingly secure the coupling portion 146 to the pad eye 610 and therefore to the bracket 133. A flange nut 625 may be used to hold the bolt 148 in place. Bracket 133 may include an opening 630 sized to allow jack 315 to move vertically. The coupler portion 144 may be welded, bolted, or otherwise secured to the trailer frame 310.

Figure 7:
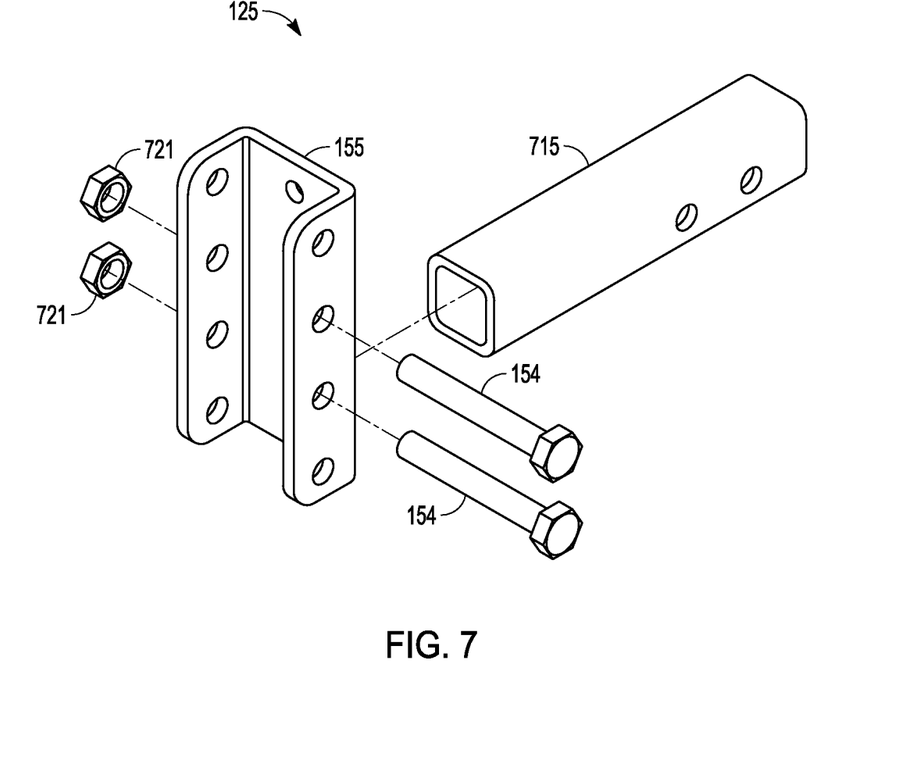
FIG. 7 is an exploded perspective view of a vehicle coupler portion according to an example embodiment.

FIG. 7 is an exploded perspective view of the vehicle coupler portion 125. Vehicle coupler portion 125 in one example may include the vehicle channel 155 affixed to an orthogonally extended wall tube 715. Wall tube 715 may be welded to the channel 155 and then may be coupled directly to a vehicle in a conventional manner. The channel 155 may include multiple openings for use with bolts 154 and corresponding nuts 721 to couple the vehicle coupler portion 125 to the upper hitch portion 110 via mating holes in position channel 152.

Although a few embodiments have been described in detail above, other modifications are possible. For example, the upper hitch portion and lower hitch portions may be reversed such that the lower hitch portion is above the upper hitch portion. Axles described may be pins, bolts, rods, or any other form of attachment that allows rotation about an axis of the axle. Components may be added to, or removed from, the described systems. Other embodiments may be within the scope of the following claims.

The invention claimed is:

1. A hitch system comprising:
   an upper hitch portion configured to couple to a trailer coupler portion and to a vehicle coupler portion;
   a weight distributing lower hitch portion coupled to the upper hitch portion, the weight distributing lower hitch portion configured to couple to spring bars extending to rearward points on a frame of the trailer; and
   a pivot bolt positioned between the upper hitch portion and lower hitch portion to bias the upper hitch portion and lower hitch portion away from each other.

2. The hitch system of claim 1 wherein the pivot bolt is threaded to mate with a threaded adjustment collar coupled to the upper hitch portion.

3. The hitch system of claim 2 wherein the pivot bolt engages an upper surface of the lower hitch portion and extends an adjustable distance vertically between the threaded opening and the upper surface of the lower hitch portion.

4. The hitch system of claim 1 wherein the upper hitch portion includes a latch portion to couple to the trailer coupler portion about a transverse axis.

5. The hitch system of claim 4 wherein the latch portion is configured to facilitate rotation of the trailer coupler portion about the transverse axis.

6. The hitch system of claim 1 wherein the upper hitch portion is rotatable about a longitudinal axis with respect to the vehicle coupler portion.

7. The hitch system of claim 6 wherein the upper hitch portion includes a vertical support coupled about the longitudinal axis at a first end and having a second end configured to couple to the weight distributing lower hitch portion.

8. The hitch system of claim 7 wherein the weight distributing lower hitch portion is rotatable about a transverse axis via the second end of the vertical support.

9. The hitch system of claim 1 wherein the weight distributing lower hitch portion includes a head assembly configured to rigidly support the spring bars.

10. The hitch system of claim 9 wherein the pivot bolt is configured to space the upper hitch portion from the lower hitch portion to bias the spring bars away from the trailer frame.

11. The hitch system of claim 10 and further comprising levers for coupling the spring bars to the trailer frame to transfer weight distribution, reducing trailer weight on the hitch system.

12. A hitch system comprising:
    an upper hitch portion to couple to a vehicle coupler;
    a trailer coupler portion configured to attach to the upper hitch portion via a first transverse axle, the trailer coupler including a first vertical axle;
    a weight distributing lower hitch portion coupled to the upper hitch portion, the weight distributing lower hitch portion configured to couple to spring bars extending to rearward points on a frame of the trailer, the weight distributing lower hitch portion including a second vertical axle that is substantially coaxial with the first vertical axis; and
    wherein the upper hitch portion and weight distributing lower hitch portion are biased away from each other to bias the spring bars away from the trailer.

13. The hitch system of claim 12 wherein the upper hitch portion includes a longitudinal axle to permit rotation of the upper hitch portion about the longitudinal axle.

14. The hitch system of claim 12 wherein the upper hitch portion and weight distributing lower hitch portion are biased away from each via a bolt positioned between the upper hitch portion and lower hitch portion.

15. The hitch system of claim 14 wherein the bolt comprises an adjustable length pivot bolt to adjust the amount of bias.

16. The hitch system of claim 12 wherein the weight distributing lower hitch portion is coupled to the upper hitch portion via a second transverse axle allowing rotation of the upper hitch portion and weight distributing lower hitch portions about the first and second transverse axles.

17. The hitch system of claim 12 and further comprising levers for coupling the biased pivot bars to the trailer frame to transfer weight distribution rearward on the trailer, reducing trailer tongue weight on the hitch system.

18. A method of coupling a trailer to a vehicle, the method comprising:
    coupling the trailer and vehicle to an upper hitch that is rotatable about a longitudinal axis, a first transverse axis, and a first vertical axis;
    coupling the upper hitch to a lower hitch that is rotatable about a second transverse axis and a second vertical axis;
    biasing spring bars coupled to the lower hitch portion downward, away from a trailer frame; and
    coupling the spring bars to the trailer at points rearward on the frame of the trailer to transfer trailer weight rearward.

19. The method of claim 18 and further comprising adjusting the amount of bias on the spring bars.

20. The method of claim 19 wherein adjusting the amount of bias on the spring bars is performed via adjusting a length of a pivot bolt positioned between the upper and lower hitches to cause rotation about the second transverse axis.

* * * * *